United States Patent Office 3,378,556
Patented Apr. 16, 1968

3,378,556
3,4,5,6 - TETRAHYDRO - 2 - KETO - 6 - PHENYL-
4,4,5 - TRIMETHYL - 2H - 1,3,4 - OXADIAZIN-
IUM HALIDES
Donald L. Trepanier, Indianapolis, Ind., assignor to The
Dow Chemical Company, Midland, Mich., a corporation of Delaware
No Drawing. Filed Sept. 23, 1966, Ser. No. 581,446
2 Claims. (Cl. 260—244)

This invention is directed to novel 3,4,5,6-tetrahydro-2-keto-6-phenyl-4,4,5-trimethyl-2H - 1,3,4 - oxadiazinium halides corresponding to the formula:

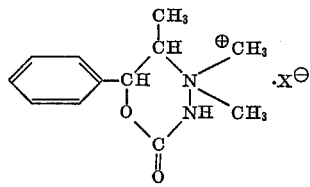

In the present specification and claims, X represents bromide or iodide. The compounds of the present invention are crystalline solids that are soluble in methanol, acetone, acetonitrile, dimethylformamide and dimethylsulfoxide and less soluble in water and ethanol. These compounds have been found to be useful as herbicides for the control of pest plants, including such representative organisms as pigweeds and barnyard grass.

The new compounds of the present invention are prepared by reacting methyl iodide or methyl bromide with 3,4,5,6-tetrahydro-4,5-dimethyl-6-phenyl-2H - 1,3,4 - oxadiazin-2-one. The reaction is conveniently carried out in an inert organic solvent as reaction medium and proceeds readily at temperatures of from 20° to 180° C., and conveniently at the boiling temperature of the reaction mixture. The proportions of the reactants to be employed are not critical, some of the desired product being obtained when combining the reactants in any proportions. However, the reaction consumes the reactants in substantially equimolar proportions and the use of the reactants in at least such proportions is desirable, an excess of the methyl halide being preferred.

In carrying out the preparation of the 3,4,5,6-tetrahydro-2-keto-6-phenyl-4,4,5-trimethyl-2H,1,3,4 - oxadiazinium bromide and iodide compounds of the present invention, the reactants and the inert reaction medium are contacted together in any order or fashion. Representative inert organic liquid reaction mediums include acetone, methanol, ether and ethanol. The reaction mixture is then heated at a temperature within the reaction temperature range for a period of time. In a convenient procedure, the reaction mixture is heated at the boiling temperature and under reflux for a short period of time. In those cases where the product precipitates in the reaction mixture as a solid material, it can be separated by such conventional procedures as filtration, decantation or centrifugation. In other operations, the reaction mixture may be fractionally distilled under reduced pressure to remove the low boiling constituents and obtain the product as a solid residue. The product separated as described above may be employed in pesticidal applications or further purified by such conventional techniques as washing or recrystallization.

The 3,4,5,6-tetrahydro-4,5 - dimethyl - 6 - phenyl - 2H-1,3,4-oxadiazin-2-one employed as a starting material herein is disclosed and claimed in my copending joint application with Guy H. Harris for "Novel Substituted 3,4,5,6-Tetrahydro-2H-1,3,4-Oxadiazin-2-one Compounds and Method of Preparation Thereof," Ser. No. 581,449, filed concurrently herewith.

The following examples will enable those skilled in the art to practice the invention and are illustrative of the present invention but are not to be construed as limiting the same.

Example 1

3,4,5,6-tetrahydro-4,5-dimethyl - 6 - phenyl - 2H - 1,3,4-oxadiazin-2-one (5.0 grams), methyl iodide (20 milliliters) and acetone (50 milliliters) were mixed together in a round-bottom flask and the mixture heated under reflux for 7.5 hours. The resulting mixture was cooled and diethyl ether added thereto. The mixture was then maintained at room temperature for 18 hours to precipitate the product in crystalline form. Thereafter, the resulting crystals were suction filtered and washed with ether. The crystals were redissolved in hot ethanol, ether added until precipitated was complete. The product was again suction filtered. The crystalline filter cake was washed with cold ethanol. The solid was recrystallized by dissolving in a minimal amount of methanol and adding ether until precipitation was complete. The product was again suction filtered, and the 3,4,5,6-tetrahydro-2-keto-6-phenyl-4,4,5-trimethyl-2H-1,3,4-oxadiazinium iodide product was found to melt at 143°–144° C. with decomposition. This product was found to contain 41.61 percent by weight of carbon, 5.22 percent of hydrogen and 7.98 percent of nitrogen, by analysis, as compared to the percentages of 41.39, 4.92 and 8.05, respectively, calculated for the named structure.

Example 2

In substantially the same procedure as in Example 1, 3,4,5,6-tetrahydro-2-keto-6-phenyl - 4,4,5 - trimethyl - 2H-1,3,4-oxadiazinium bromide, having a molecular weight of 301, is prepared by reacting one molar proportion of 3,4,5,6 - tetrahydro - 4,5 - dimethyl - 6 - phenyl-2H-1,3,4-oxadiazin-2-one and an excess of methyl bromide.

The oxadiazinium halides of the present invention are employed as the sole toxicant in herbicides to be employed for the control of various plant pests.

For such uses, the compounds can be employed in an unmodified form or dispersed on a finely divided solid and employed as dusts. Such mixtures also can be dispersed in water with or without the aid of a surface active agent and the resulting aqueous suspensions employed as sprays. In other procedures, the products are employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

In representative operations, aqueous compositions containing 3,4,5,6-tetrahydro-2-keta - 6 - phenyl-4,4,5-trimethyl-2H-1,3,4-oxidazinium iodide as the sole toxicant in an amount sufficient to provide a toxicant concentration equivalent to 50 pounds per acre when added to areas of soil containing viable seed of sorghum/milo gave substantially complete kills of sorghum/milo. In other operations, aqueous compositions containing 3,4,5,6-tetrahydro-2-keto-6-phenyl-4,4,5 - trimethyl - 2H - 1,3,4-oxadiazinium iodide as the sole toxicant when added to soil in an amount sufficient to provide a concentration equivalent to 25 pounds of toxicant per acre of soil gave substantially complete kills of pigweeds and barnyard grass which had been seeded in the treated areas prior to the application.

I claim:
1. The 3,4,5,6-tetrahydro - 2 - keto - 6-phenyl-4,4,5-trimethyl-2H-1,3,4-oxidiazinium halide compound corresponding to the formula

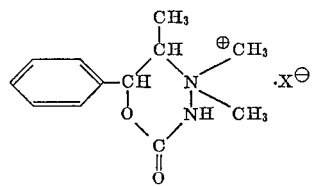

wherein X represents a member of the group consisting of iodide and bromide.

2. The oxadiazinium halide compound claimed in claim 1 wherein the compound is 3,4,5,6-tetrahydro-2-keto-6-phenyl-4,4,5-trimethyl-2H-1,3,4-oxadiazinium iodide.

References Cited

Haworth et al.: Jour. Chem. Soc., 1947, pages 176–82.

JOHN D. RANDOLPH, *Primary Examiner.*

N. TROUSOF, *Assistant Examiner.*